US008588219B2

(12) United States Patent
Tazaki

(10) Patent No.: US 8,588,219 B2
(45) Date of Patent: Nov. 19, 2013

(54) CIRCUIT EMULATION METHOD AND DEVICE

(75) Inventor: Yuichi Tazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 416 days.

(21) Appl. No.: 12/820,653

(22) Filed: Jun. 22, 2010

(65) Prior Publication Data

US 2010/0329281 A1    Dec. 30, 2010

(30) Foreign Application Priority Data

Jun. 29, 2009    (JP) .................................. 2009-153509

(51) Int. Cl.
    *H04J 1/02* (2006.01)
(52) U.S. Cl.
    USPC ........................................ 370/356; 370/493
(58) Field of Classification Search
    USPC ......... 370/352, 356, 386, 389, 392, 419, 429, 370/493
    See application file for complete search history.

(56) References Cited

U.S. PATENT DOCUMENTS

| | | | | |
|---|---|---|---|---|
| 5,365,524 A | * | 11/1994 | Hiller et al. | 370/376 |
| 6,128,301 A | * | 10/2000 | Bernstein | 370/395.61 |
| 6,148,001 A | * | 11/2000 | Soirinsuo et al. | 370/395.4 |
| 6,151,336 A | * | 11/2000 | Cheng et al. | 370/535 |
| 6,418,144 B1 | * | 7/2002 | Saeki | 370/395.6 |
| 7,042,845 B1 | * | 5/2006 | Naumann | 370/235 |
| 7,133,415 B2 | * | 11/2006 | Zelig et al. | 370/466 |
| 7,616,580 B2 | * | 11/2009 | Shirasaki | 370/242 |
| 7,751,408 B2 | * | 7/2010 | Pirbhai et al. | 370/395.5 |
| 2001/0043596 A1 | * | 11/2001 | Shimanuki et al. | 370/356 |
| 2003/0133461 A1 | * | 7/2003 | Ho et al. | 370/395.52 |
| 2006/0153179 A1 | * | 7/2006 | Ho et al. | 370/386 |
| 2008/0298345 A1 | * | 12/2008 | Hadzic et al. | 370/352 |

FOREIGN PATENT DOCUMENTS

| | | |
|---|---|---|
| JP | 7-336354 A | 12/1995 |
| JP | 2003-188988 A | 7/2003 |
| JP | 2008199162 A | 8/2008 |

OTHER PUBLICATIONS

A. Vainshtein, Structure-Aware Time Division Multiplexed (TDM) Circuit Emulation Service over Packet Switched Network (CESoPSN).*
A. Vainshtein, Structure-Aware Time Division Multiplexed (TDM) Circuit Emulation Service over Packet Switched Network (CESoPSN), Dec. 2007.*
A. Vainshtein, Ed. et al, "Structure-Aware Time Division Multiplexed (TDM) Circuit Emulation Service over Packet Switched Network (CESoPSN)", Network Working Group, Request for Comments: 5086, Dec. 2007.
Japanese Office Action for JP2009-153509 mailed on Apr. 4, 2013 with Partial English Translation.

* cited by examiner

*Primary Examiner* — Habte Mered
*Assistant Examiner* — Prince A Mensah

(57) ABSTRACT

A circuit emulation method and device are provided that can enhance the efficiency in packet transmission and achieve the effective use of the network band by reducing the number of packets. A circuit emulation device for connecting a plurality of TDM circuits to an asynchronous network includes: a table storing the addresses of other circuit emulation devices on the asynchronous network, the addresses serving as the destinations for the plurality of TDM circuits; a packet assembly section that generates a multiplex packet in such a manner that a payload is made by bundling TDM data to those TDM circuits, among the plurality of TDM circuits, having the same destination address, which is found by referring to the table, and that the destination address is added to the payload; and a transmission section that transmits the multiplex packet to the asynchronous network.

13 Claims, 6 Drawing Sheets

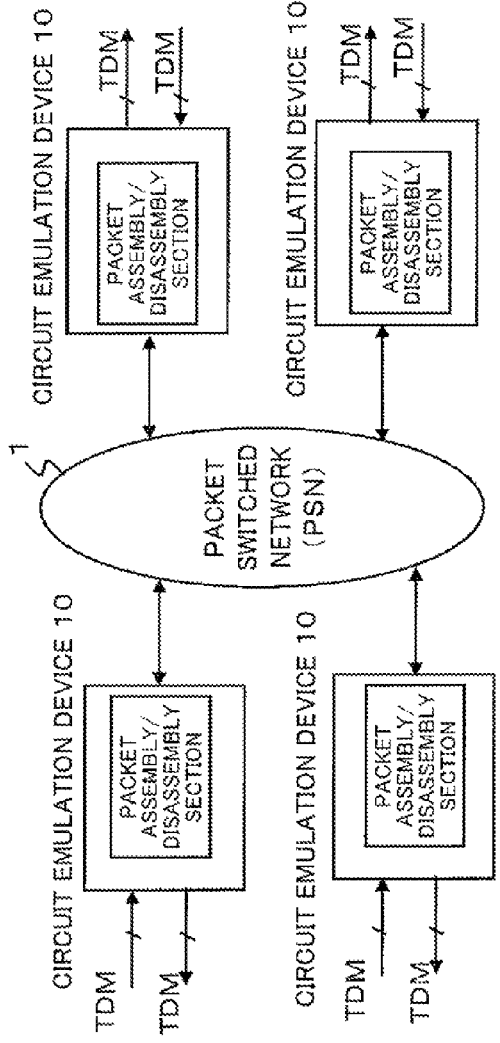
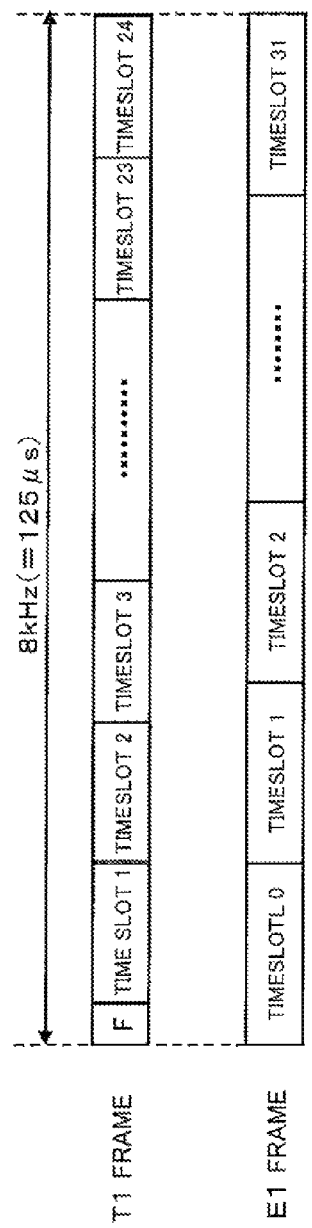

FIG. 3C

OUTPUT PORT SEARCH TABLE 111

| ECID | OUTPUT-SIDE TDM CIRCUIT NUMBER |
|---|---|
| ECIDa | CIRCUIT NUMBER #1 |
| ECIDb | |
| ECIDd | |
| ECIDi | CIRCUIT NUMBER #2 |
| ECIDj | |
| ECIDk | CIRCUIT NUMBER #3 |
| ECIDo | |
| ECIDt | |
| ECIDv | |

FIG. 3B

INDIVISUAL TDM DATA LENGTH INFORMATION 109

| ECID | DATA LENGTH |
|---|---|
| ECIDa | 12 BYTES |
| ECIDb | 16 BYTES |
| ECIDd | 1 BYTE |
| ECIDi | 4 BYTES |
| ...... | ...... |
| ECIDv | 8 BYTES |

FIG. 3A

ECID SEARCH TABLE 104

| MAC ADDRESS INFORMATION | ECID |
|---|---|
| DST MAC#A | ECIDa |
| | ECIDb |
| | ECIDd |
| DST MAC#B | ECIDp |
| | ECIDq |
| | ECIDr |
| | ECIDs |
| DST MAC#C | ECIDt |
| | ECIDv |
| | ECIDx |
| | ECIDy |

CIRCUIT EMULATION METHOD AND DEVICE

This application is based upon and claims the benefit of priority from Japanese Patent Application No. 2009-153509, filed on Jun. 29, 2009, the disclosure of which is incorporated herein in its entirety by reference.

BACKGROUND OF THE INVENTION

1. Field of the Invention

The present invention relates to Pseudo Wire Emulation Edge to Edge (PWE3) technology and, more particularly, to a circuit emulation method and device for transmitting time division multiplexing (TDM) signals over an asynchronous network such as Ethernet™ (hereinafter, simply referred to as Ether) or packet switched network.

2. Description of the Related Art

Various circuit emulation technologies of emulating TDM circuits over an asynchronous network such as a packet network have been proposed (for example, see Japanese Patent Application Unexamined Publication No. 2008-199162 and others). Particularly, a circuit emulation service over packet switched network (CESoPSN) has been proposed in which one or more timeslots TS destined for the same TDM circuit are bundled to generate a single packet, which is then transmitted over a packet switched network in Request for Comments 5086 (Network Working Group, "Structure-Aware Time Division Multiplexed (TDM) Circuit Emulation Service over Packet Switched Network (CESoPSN)" December 2007).

However, according to CESoPSN of RFC 5086, since a packet is generated by bundling timeslots on a TDM-circuit basis, separate packets are generated even if these packets are addressed to the same destination on a packet switched network. Therefore, multiple packets having the same Ether headers are transmitted, hampering the efficient transmission of packets and the effective use of the network band. Moreover, since there is multiple-packets traffic over the packet network, jitters may easily occur due to congestion at routers and like equipment.

SUMMARY OF THE INVENTION

Accordingly, an object of the present invention is to provide a circuit emulation method and device that can enhance the efficiency in packet transmission and achieve the effective use of the network band by reducing the number of packets.

According to the present invention, a circuit emulation device for connecting a plurality of time division multiplexing (TDM) circuits to an asynchronous network, includes: a table storing addresses of other circuit emulation devices on the asynchronous network, each of the TDM circuits corresponding to one of the addresses as a destination address; a packet assembly section for bundling TDM data of TDM circuits having same destination address by referring to the table, to assemble a multiplex packet which has a packet header including the same destination address as its destination address; and a transmitter for transmitting the multiplex packet to the destination address through the asynchronous network.

According to the present invention, a circuit emulation method for connecting a plurality of time division multiplexing (TDM) circuits to an asynchronous network, includes: terminating a TDM signal on each of the TDM circuits; generating a payload by bundling TDM data of TDM circuits having same destination address by referring to a table which stores addresses of other circuit emulation devices on the asynchronous network in a storage section, each of the TDM circuits corresponding to one of the addresses as a destination address; assembling a multiplex packet by adding a packet header to the payload, wherein the packet header includes the same destination address as its destination address; and transmitting the multiplex packet to the destination address through the asynchronous network.

According to the present invention, TDM data can be multiplexed on a packet-destination basis. Accordingly, it is possible to enhance the efficiency in packet transmission and achieve the effective use of the network band by reducing the number of packets.

BRIEF DESCRIPTION OF THE DRAWINGS

FIG. 1A is a schematic diagram of a network using circuit emulation devices according to an exemplary embodiment of the present invention.

FIG. 1B is a format diagram showing examples of TDM frame.

FIG. 3A is a schematic diagram showing an example of ECID search table shown in FIG. 2.

FIG. 3B is a schematic diagram showing an example of individual TDM data length information shown in FIG. 2.

FIG. 3C is a schematic diagram showing an example of output port search table shown in FIG. 2.

DETAILED DESCRIPTION OF THE PREFERRED EMBODIMENTS

1. Exemplary Embodiment

Referring to FIG. 1A, it is assumed here that an asynchronous network is a packet switched network 1, to which a plurality of circuit emulation devices 10 according to an exemplary embodiment of the present invention are connected. Each circuit emulation device 10 is provided with a packet assembly/disassembly section, which will be described later. The circuit emulation device 10 multiplexes timeslots of TDM frames to generate a multiplex packet, which will be described later, and sends it to a destination circuit emulation device 10 through the packet switched network 1. At the destination circuit emulation device 10, multiplexed TDM data, which are stored in the payload of the multiplex packet, are converted into TDM frames for each TDM circuit and sent out to their respective TDM circuits.

A TDM frame in the present exemplary embodiment may be any one of a T1 frame and an E1 frame as shown in FIG. 1B. If it is a T1 frame, framing information F is present at the top of the frame. If it is an E1 frame, framing information is stored in each timeslot TS.

The packet assembly/disassembly section of any of the circuit emulation devices 10 extracts timeslots from TDM frames and, if timeslots have the same destination on the packet switched network 1, multiplexes these timeslots onto the payload of a single packet even if the output-side TDM circuits of these timeslots are different. The thus generated multiplex packet is transmitted to the destination circuit emulation device 10 through the packet switched network 1.

As described above, Ether packets are not generated on a TDM-circuit basis, but timeslots destined for the same packet destination are multiplexed into a single packet even if they are to be output to different TDM circuits. Thus, the efficiency in packet transmission as well as band efficiency can be increased. Hereinafter, an example of the present invention using CESoPSN, which is defined in RFC 5086/MEF 8, will be described in detail.

2. Circuit Emulation Device

Figure 2:
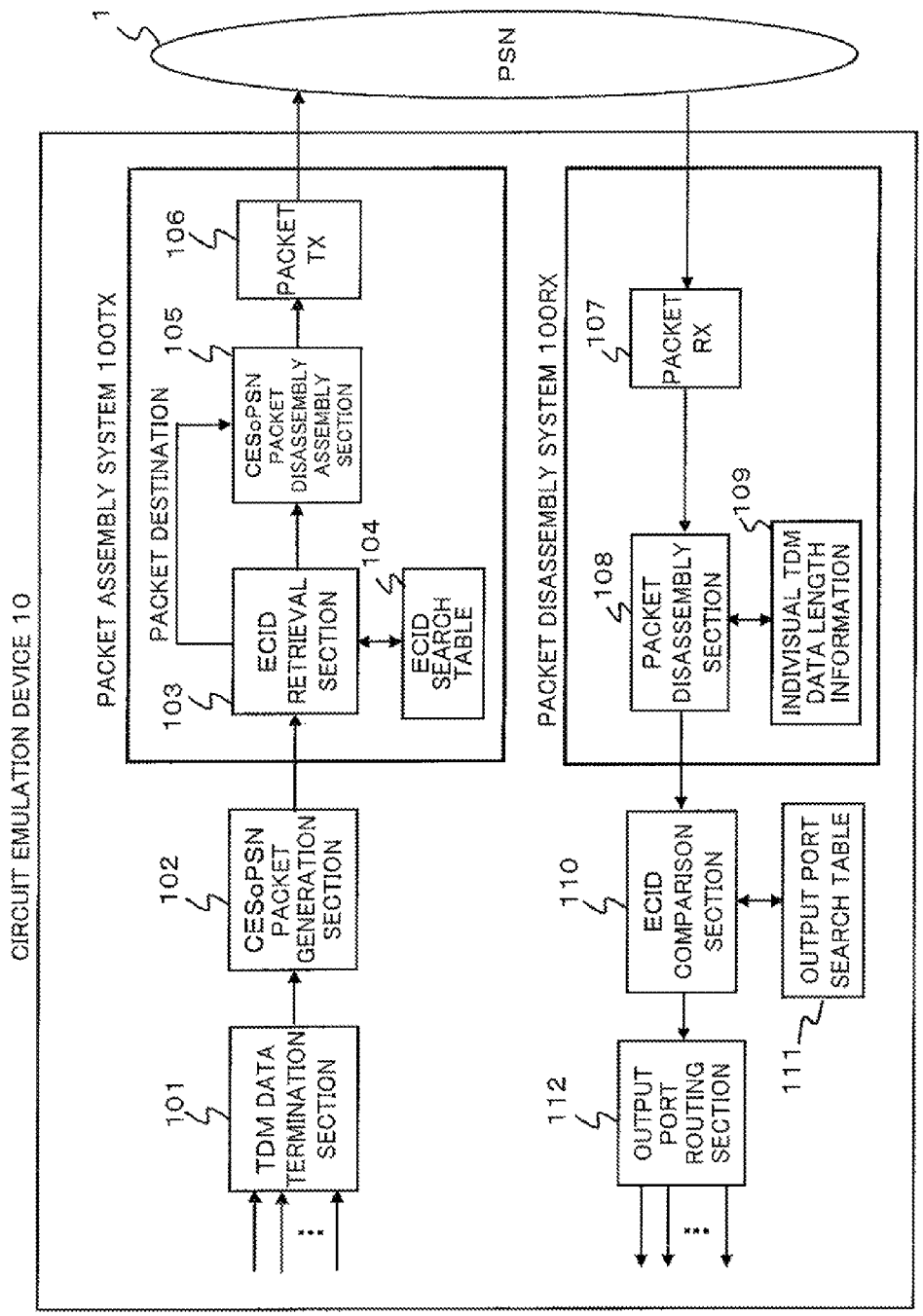
FIG. 2 is a block diagram showing the functional configuration of a circuit emulation device according to an example of the present invention.

Referring to FIG. 2, a circuit emulation device 10 according to an example of the present invention is provided with a packet assembly/disassembly section 100, which is comprised of a packet assembly system 100TX as a sending system, and a packet disassembly system 100RX as a receiving system, which will be described later. The packet assembly system 100TX multiplexes timeslots onto a payload of a single packet even if the timeslots are to be output to different TDM circuits but if the timeslots have the same destination on a packet switched network 1. The packet disassembly system 100RX disassembles a multiplex packet received from the PSN 1.

A TDM data termination section 101 receives TDM data (T1/E1) from a plurality of TDM circuits, monitors loss of signal (LOS) and loss of frame (LOF), terminates framing information, and outputs the portion of timeslots to a CESoPSN packet generation section 102. More specifically, the TDM data termination section 101 deletes a framing bit in the case of a T1 frame and outputs only the timeslot TS portion to the CESoPSN packet generation section 102. In the case of an E1 frame, the TDM data termination section 101 outputs all timeslots TS to the CESoPSN packet generation section 102 because framing information is stored in the timeslots TS.

The CESoPSN packet generation section 102 adds to the timeslots TS an emulated circuit identifier (ECID), which is circuit destination information corresponding to the output-side TDM circuit number, then generates a CESoPSN packet encapsulated with a packet header, and outputs the CESoPSN packet to an ECID retrieval section 103.

The ECID retrieval section 103 refers to an ECID search table 104 and retrieves a packet destination based on the ECID field of the CESoPSN packet. The ECID retrieval section 103 then outputs a set of this packet destination and the CESoPSN packet to a CESoPSN packet disassembly/assembly section 105. The ECID search table 104 stores the correspondences between the addresses of individual circuit emulation devices 10 on the packet switch network 1 and TDM circuits, which will be described later. That is, if searching the ECID search table 104, it is possible to know which circuit emulation device 10 accommodates which TDM circuit.

The CESoPSN packet disassembly/assembly section 105 deletes the header portion except the ECID from each CESoPSN packet and thereby disassembles each CESoPSN packet into an individual TDM payload including an ECID and a TDM payload. Thus obtained individual TDM payloads of CESoPSN packets are multiplexed (bundled) on a packet-destination basis, thereby generating a multiplex TDM payload for each packet destination. A multiplex CESoPSN packet, made by adding a packet header to the multiplex TDM payload, is then output from a packet transmission section 106 to the packet switched network 1.

A packet reception section 107 checks a multiplex CESoPSN packet received from another circuit emulation device 10 and, if finding no anomaly, outputs it to a packet disassembly section 108. The packet disassembly section 108 refers to individual TDM data length information 109 for each ECID, disassembles the multiplex TDM payload of the multiplex CESoPSN packet into individual TDM payloads, and outputs them to an ECID comparison section 110.

The ECID comparison section 110 refers to an output port search table 111, identifies based on the ECID in each individual TDM payload the TDM circuit number of a TDM circuit to which TDM data of interest is to be output, and outputs the identified TDM circuit number along with the TDM data of interest to an output port routing section 112.

The output port routing section 112 routes the TDM data to an appropriate one of a plurality of TDM (T1/E1) circuits in accordance with the TDM circuit number.

As described above, the packet assembly system 100TX includes the ECID retrieval section 103, ECID search table 104, CESoPSN packet disassembly/assembly section 105, and packet transmission section 106, and the packet disassembly system 100RX includes the packet reception section 107, packet disassembly section 108, and individual TDM data length information 109. Note that similar functions of the circuit emulation device 10 except the ECID search table 104, individual TDM data length information 109, and output port search table 111 can also be implemented by a program-controlled processor executing programs stored in a recording medium (not shown).

Referring to FIG. 3A, the ECID search table 104 stores the correspondences between the MAC addresses of individual circuit emulation devices 10 on the packet switched network 1 and ECIDS each identifying TDM circuits. Here, it is assumed that emulated circuit identifiers ECIDa, ECIDb, and ECIDd are related to a single MAC address MAC #A and that similarly a plurality of emulated circuit identifiers are related to the MAC address of each circuit emulation device 10. The ECID retrieval section 103 can obtain MAC address information, which is a destination, from an ECID in a CESoPSN packet input from the CESoPSN packet generation section 102.

Referring to FIG. 3B, it is assumed that the length of data for each ECID is stored in the individual TDM data length information 109. In this example, data lengths are 12 bytes, 16 bytes, and 1 byte for the emulated circuit identifiers ECIDa, ECIDb, and ECIDd, respectively. The packet disassembly section 108 can take out each individual TDM payload from the multiplex TDM payload of a received multiplex CESoPSN packet by comparing each ECID in the multiplex TDM payload with the individual TDM data length information 109.

Referring to FIG. 3C, the output port search table 111 stores the correspondences between ECIDS and output-side TDM circuit numbers. The ECID comparison section 110 can identify the TDM circuit number of a TDM circuit to which the TDM data of an individual TDM payload is to be output, by searching the output port search table 111 according to the ECID in the individual TDM payload.

Figure 4:
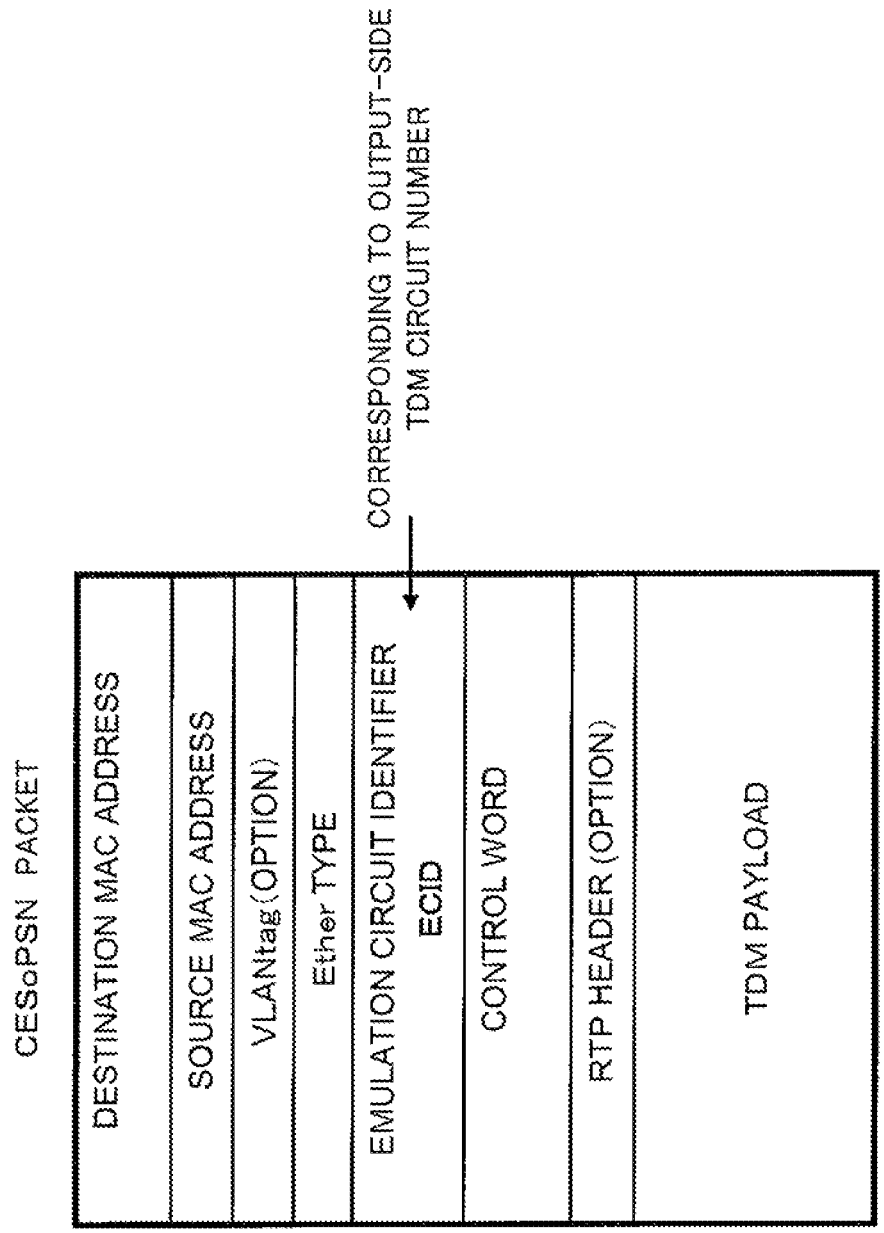
FIG. 4 is a format diagram of a CESoPSN packet used in the present exemplary embodiment.

Additionally, as shown in FIG. 4, an ECID corresponding to a output-side TDM circuit is added into the header of a CESoPSN packet generated by the CESoPSN packet generation section 102.

3. Assembly of Multiplex Packet

First, the TDM data termination section 101 receives TDM data (T1/E1), monitors loss of signal (LOS) and loss of frame (LOF), and terminates framing information. If the circuit type is T1, the TDM data termination section 101 deletes a framing bit and outputs only the portion of timeslots to the CESoPSN packet generation section 102.

The CESoPSN packet generation section 102 generates a CESoPSN packet as shown in FIG. 4 by adding an emulated circuit identifier ECID corresponding to the output-side TDM circuit number to a packet header which is created using a predetermined destination MAC address and a source address for one or more timeslots to be output to the same TDM circuit. The CESoPSN packet generation section 102 then outputs the generated CESoPSN packet to the ECID retrieval section 103. The ECID retrieval section 103 uses the ECID field of the CESoPSN packet as a search key to search the ECID search table 104 for a MAC address that is the packet destination. The ECID retrieval section 103 outputs a set of a CESoPSN packet and its MAC address to the CESoPSN packet disassembly/assembly section 105.

The CESoPSN packet disassembly/assembly section 105 deletes the header portion other than the ECID from each CESoPSN packet, thereby disassembling each CESoPSN packet into an individual TDM payload including an ECID and a TDM payload.

Figure 5:
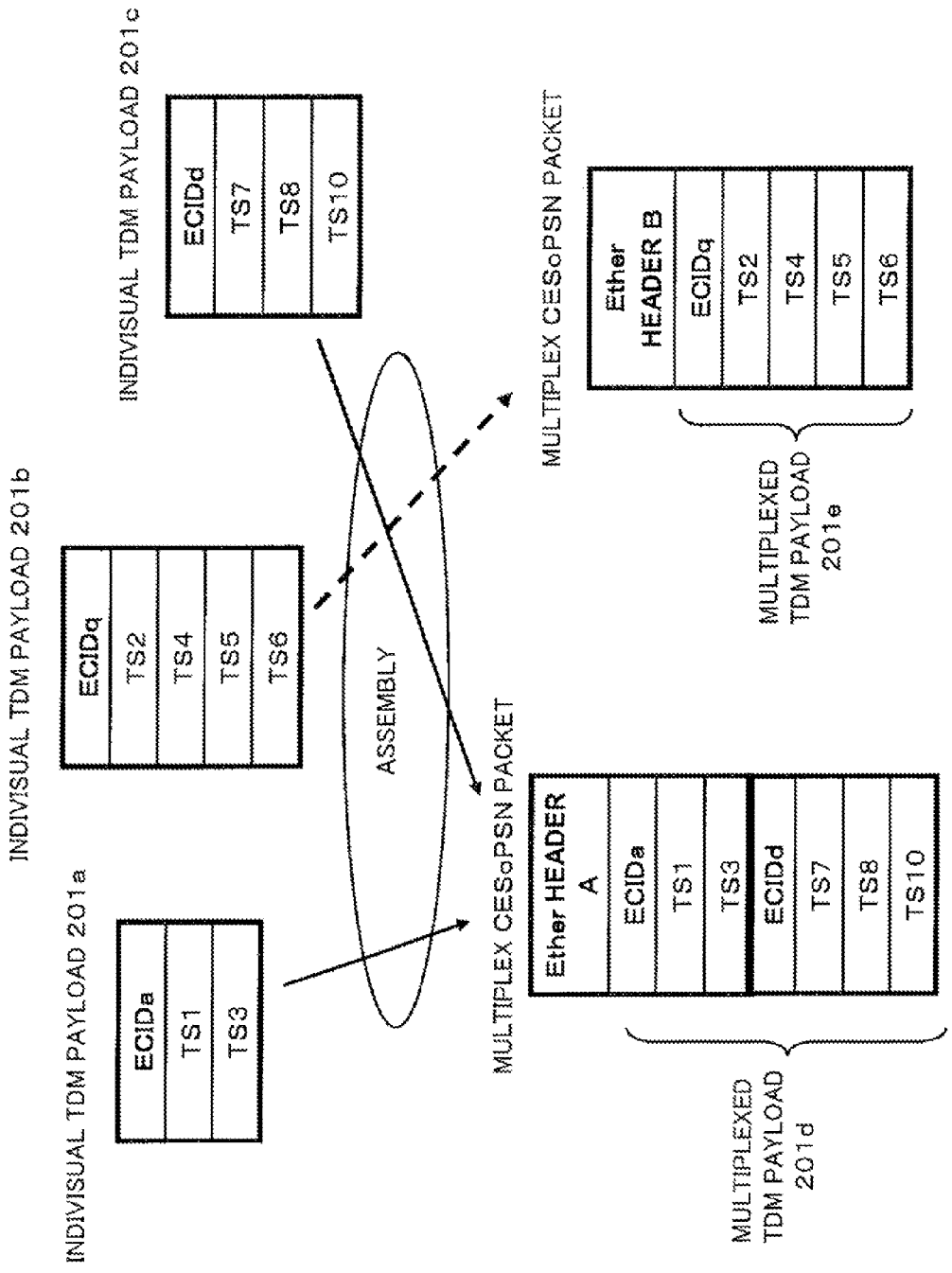
FIG. 5 is a schematic diagram showing an example of processing for assembling a CESoPSN packet at a sending system in the circuit emulation device shown in FIG. 2.

As shown in FIG. 5, it is assumed that, as an example, three CESoPSN packets are individually disassembled to obtain three individual TDM payloads 201a, 201b, and 201c. Of these individual TDM payloads, it can be found from the ECID search table 104 shown in FIG. 3A that the individual TDM payloads 201a and 201c have identical destination MAC address information MAC #A. Accordingly, the individual TDM payloads 201a and 201c are bundled (multiplexed) to generate a multiplex TDM payload 201d. An Ether header A including the destination address MAC #A is added back to the multiplex TDM payload 201d, thereby generating a multiplex CESoPSN packet, which is then output to the packet switched network 1. Since it is found from the ECID search table 104 shown in FIG. 3A that only the individual TDM payload 201b has destination MAC address information MAC #B, a multiplex TDM payload 201e is constituted by the individual TDM payload 201b. An Ether header B including the destination address MAC #B is added back to the multiplex TDM payload 201e, thereby generating a multiplex CESoPSN packet, which is then output to the packet switched network 1 through the packet transmission section 106.

4. Disassembly of Multiplex Packet

Upon receipt of a multiplex CESoPSN packet as described above from another circuit emulation device 10, the packet reception section 107 performs a CRC check and the like on the received multiplex CESoPSN packet and, if finding no anomaly in the packet, outputs it to the packet disassembly section 108.

Figure 6:
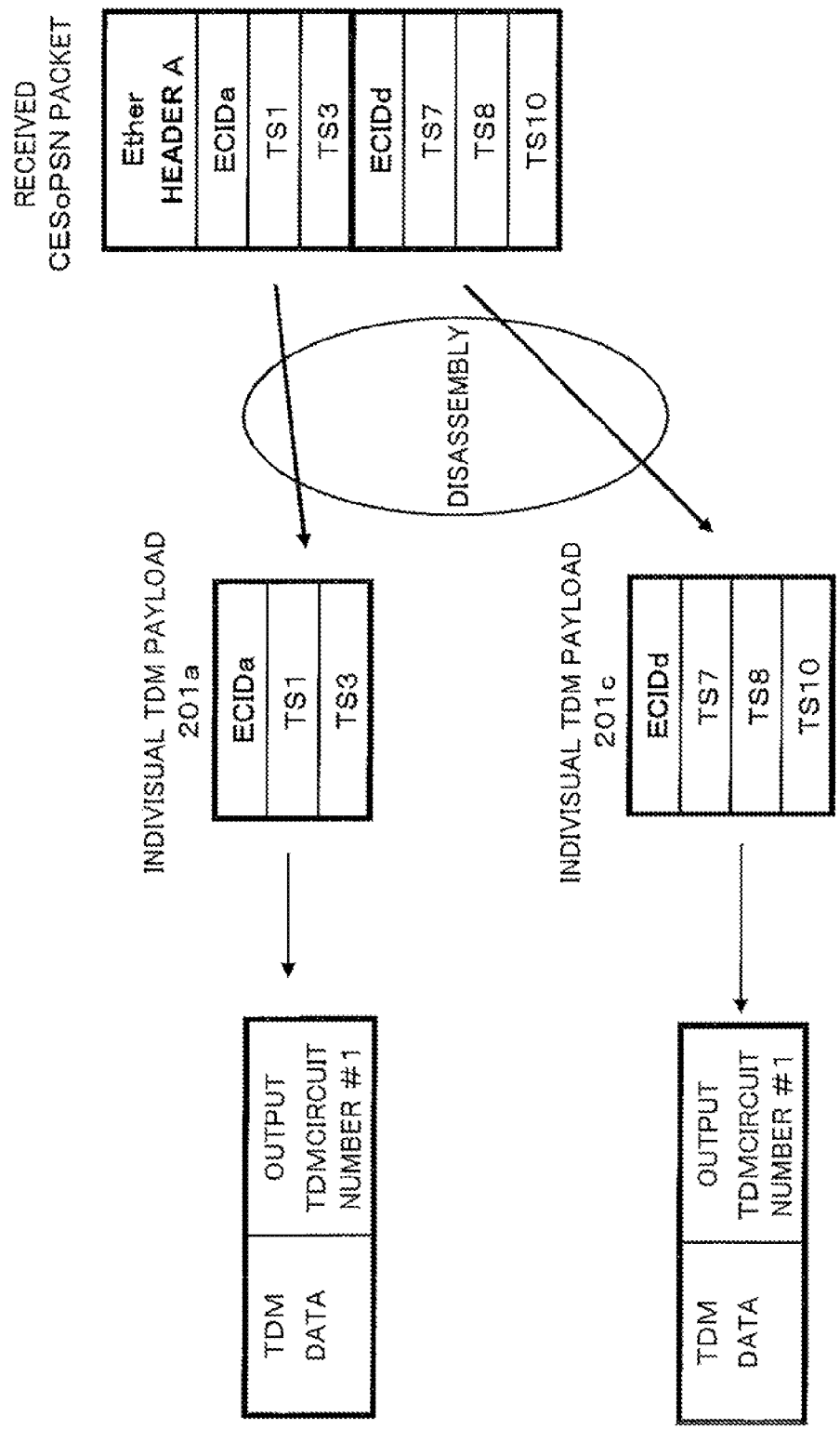
FIG. 6 is a schematic diagram showing an example of processing for disassembling a CESoPSN packet at a receiving system in the circuit emulation device shown in FIG. 2.

The packet disassembly section 108 reads out ECIDS from the multiplex TDM payload of the received multiplex CESoPSN packet. By using the data length corresponding to each ECID obtained from the individual TDM data length information 109, the packet disassembly section 108 disassembles the multiplex TDM payload into, for example, individual TDM payloads 201a and 201c as shown in FIG. 6. The individual TDM payloads 201a and 201c obtained by disassembly are output to the ECID comparison section 110.

The ECID comparison section 110 compares the ECID field data of the output port search table 111 with the ECIDa and ECIDd prefixed to the individual TDM payloads 201a and 201c to identify the TDM circuit number for each of the individual TDM payloads 201a and 201c. In this example, the TDM circuit number #1 is identified for the individual TDM payloads 201a and 201c. The TDM circuit number and TDM data are output to the output port routing section 112.

The output port routing section 112 routes the TDM data to an appropriate one of a plurality of TDM (T1/E1) circuits in accordance with the TDM circuit number. The output port routing section 112 outputs the TDM data to its output-side TDM circuit after deleting the target physical number and retiming so that timeslots are properly aligned.

5. Advantageous Effects

As described above, according to the present exemplary embodiment, packets are not generated on a TDM-circuit basis, but TDM data can be multiplexed on a packet-destination basis into a single packet even if their output-side TDM circuits are different. Accordingly, it is possible to enhance the efficiency in packet transmission as well as band efficiency.

Moreover, according to the present exemplary embodiment, since an ECID is used for destination information, it is possible to reduce the destination/source MAC address area in the header of an Ether packet. Furthermore, a standard format of CESoPSN is employed for a CESoPSN packet generated by the CESoPSN packet generation section 102. This also brings the advantage that the compatibility with a format provided by a recommendation can be maintained when multiplexing is not required.

6. Other Exemplary Embodiments

Although an ECID is used for circuit destination information in the above-described exemplary embodiment, it is also possible to use a multi-protocol label switched (MPLS) label or UDP port number in place of an ECID for circuit destination information. This makes it possible to support all packet formats discussed in RFC 5086.

Moreover, in the above-described exemplary embodiment, the CESoPSN packet generation section 102 generates a CESoPSN packet from TDM data and further the CESoPSN packet disassembly/assembly section 105 again performs assembly processing. However, the present invention is not limited to such a configuration. It is also possible that when a CESoPSN packet is generated, the generation of a multiplex TDM payload and the assembly of a multiplex CESoPSN packet are performed concurrently. In other words, the function of the packet assembly system 100TX can be incorporated into the CESoPSN packet generation section 102.

7. Supplementary Notes

The whole or part of the exemplary embodiments disclosed above can be described as, but not limited to, the following supplementary notes.

(Supplementary Note 1)

A circuit emulation device for connecting a plurality of time division multiplexing (TDM) circuits to an asynchronous network, comprising:

a table storing addresses of other circuit emulation devices on the asynchronous network, each of the TDM circuits corresponding to one of the addresses as a destination address;

a packet assembly section for bundling TDM data of TDM circuits having same destination address by referring to the table, to assemble a multiplex packet which has a packet header including the same destination address as its destination address; and a transmitter for transmitting the multiplex packet to the destination address through the asynchronous network.

(Supplementary Note 2)

The circuit emulation device according to supplementary note 1, wherein the packet assembly section comprises:

an individual payload generation section for generating an individual TDM payload including TDM data of each TDM circuit and circuit destination information of the TDM circuit; and a multiplex payload generating section for generating a multiplex payload of the multiplex packet by bundling individual TDM payloads of the same destination address by referring to the table.

(Supplementary Note 3)

The circuit, emulation device according to supplementary note 2, wherein the packet assembly section further comprises:

a packet generation section for generating an individual packet according to Circuit Emulation Service over Packet Switched Network (CESoPSN) from TDM data of each TDM circuit, wherein the individual payload generation section generates the individual TDM payload by deleting header information other than the circuit destination information from the individual packet.

(Supplementary Note 4)

The circuit emulation device according to supplementary note 2 or 3, wherein the circuit destination information includes. Emulated Circuit Identifier (SCID).

(Supplementary Note 5)

The circuit emulation device according to supplementary note 2 or 3, wherein the circuit destination information includes a Multi-Protocol Label Switched (MPLS) label and UDP port number.

(Supplementary Note 6)

The circuit emulation device according to any one of supplementary notes 1-5, further comprising:

a receiver for receiving a multiplex packet from another circuit emulation device through the asynchronous network; and a packet disassembly section for disassembling the received multiplex packet and extracting TDM data for each TDM circuit from a payload of the received multiplex packet.

(Supplementary Note 7)

A circuit emulation method for connecting a plurality of time division multiplexing (TDM) circuits to an asynchronous network, comprising:

terminating a TDM signal on each of the TDM circuits;

generating a payload by bundling TDM data of TDM circuits having same destination address by referring to a table which stores addresses of other circuit emulation devices on the asynchronous network in a storage section, each of the TDM circuits corresponding to one of the addresses as a destination address;

assembling a multiplex packet by adding a packet header to the payload, wherein the packet header includes the same destination address as its destination address; and transmitting the multiplex packet to the destination address through the asynchronous network.

(Supplementary Note 8)

The circuit emulation method according to supplementary note 7, wherein the payload is generated by:

generating an individual TDM payload including TDM data of each TDM circuit and circuit destination information of the TDM circuit; and bundling individual TDM payloads of the same destination address by referring to the table.

(Supplementary Note 9)

The circuit emulation method according to supplementary note 8, wherein the individual TDM payload is generated by:

generating an individual packet according to Circuit Emulation Service over Packet Switched Network (CESoPSN) from TDM data of each TDM circuit; and deleting header information other than the circuit destination information from the individual packet.

(Supplementary Note 10)

The circuit emulation method according to supplementary note 8 or 9, wherein the circuit destination information includes Emulated Circuit Identifier (ECID).

(Supplementary Note 11)

The circuit emulation method according to supplementary note 8 or 9, wherein the circuit destination information includes a Multi-Protocol Label Switched (MPLS) label and UDP port number.

(Supplementary Note 12)

A system comprising an asynchronous network and a plurality of circuit emulation devices, wherein each circuit emulation device connects a plurality of time division multiplexing (TDM) circuits to the asynchronous network, wherein at a transmission-side circuit emulation device comprises:
a table storing addresses of other circuit emulation devices on the asynchronous network, each of the TDM circuits corresponding to one of the addresses as a destination address;
a packet assembly section for bundling TDM data of TDM circuits having same destination address by referring to the table, to assemble a multiplex packet which has a packet header including the same destination address as its destination address; and
a transmitter for transmitting the multiplex packet to the destination address through the asynchronous network, and at a reception-side circuit emulation device comprises:
a receiver for receiving the multiplex packet from the transmission-side circuit emulation device through the asynchronous network; and
a packet disassembly section for disassembling the received multiplex packet and extracting TDM data for each TDM circuit from a payload of the received multiplex packet.

(Supplementary Note 13)

The system according to supplementary note 12, wherein the packet assembly section comprises:

an individual payload generation section for generating an individual TDM payload including TDM data of each TDM circuit and circuit destination information of the TDM circuit; and a multiplex payload generating section for generating a multiplex payload of the multiplex packet by bundling individual TDM payloads of the same destination address by referring to the table.

(Supplementary Note 14)

A communication method in a system comprising an asynchronous network and a plurality of circuit emulation devices, wherein each circuit emulation device connects a plurality of time division multiplexing (TDM) circuits to the asynchronous network, comprising:

at a transmission-side circuit emulation device, storing addresses of other circuit emulation devices on the asynchronous network in a storage section, each of the TDM circuits corresponding to one of the addresses as a destination address;

bundling TDM data of TDM circuits having same destination address by referring to the table, to assemble a multiplex packet which has a packet header including the same destination address as its destination address;

transmitting the multiplex packet to the destination address through the asynchronous network;

at a reception-side circuit emulation device, receiving the multiplex packet from the transmission-side circuit emulation device through the asynchronous network; and disassembling the received multiplex packet and extracting TDM data for each TDM circuit from a payload of the received multiplex packet.

(Supplementary Note 15)

A computer-readable program stored in a recording medium, for instructing a program-controlled processor to function as a circuit emulation device for connecting a plurality of time division multiplexing (TDM) circuits to an asynchronous network, comprising:

terminating a TDM signal on each of the TDM circuits;

generating a payload by bundling TDM data of TDM circuits having same destination address by referring to a table which stores addresses of other circuit emulation devices on the asynchronous network in a storage section, each of the TDM circuits corresponding to one of the addresses as a destination address;

assembling a multiplex packet by adding a packet header to the payload, wherein the packet header includes the same destination address as its destination address; and transmitting the multiplex packet to the destination address through the asynchronous network.

(Supplementary Note 16)

The computer-readable program according to supplementary note 14, further comprising:

receiving a multiplex packet from another circuit emulation device through the asynchronous network; and disassembling the received multiplex packet and extracting TDM data for each TDM circuit from a payload of the received multiplex packet.

The present invention can be applied to TDM circuit emulation technologies in general.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A circuit emulation device for connecting a plurality of time division multiplexing (TDM) circuits to an asynchronous network, comprising:
   a table storing addresses of other circuit emulation devices on the asynchronous network, each of the TDM circuits corresponding to one of the addresses as a destination address;
   a packet assembly section for bundling TDM data of TDM circuits having same destination address by referring to the table, to assemble a multiplex packet which has a packet header including the same destination address as its destination address;
   and a transmitter for transmitting the multiplex packet to the destination address through the asynchronous network,
   wherein the packet assembly section comprises:
      a packet generation section for generating an individual packet from TDM data of each TDM circuit;
      an individual payload generation section for generating an individual TDM payload by deleting header information other than the circuit destination information from the individual packet; and
      a multiplex payload generating section for generating a multiplex payload of the multiplex packet by bundling individual TDM payloads of the same destination address by referring to the table.

2. The circuit emulation device according to claim 1, wherein the packet generation section generates the individual packet according to Circuit Emulation Service over Packet Switched Network (CESoPSN) from TDM data of each TDM circuit.

3. The circuit emulation device according to claim 1 wherein the circuit destination information includes Emulated Circuit Identifier (ECID).

4. The circuit emulation device according to claim 1, wherein the circuit destination information includes a Multi-Protocol Label Switched (MPLS) label and UDP port number.

5. The circuit emulation device according to claim 1, further comprising:
   a receiver for receiving a multiplex packet from another circuit emulation device through the asynchronous network; and
   a packet disassembly section for disassembling the received multiplex packet and extracting TDM data for each TDM circuit from a payload of the received multiplex packet.

6. A circuit emulation method for connecting a plurality of time division multiplexing (TDM) circuits to an asynchronous network, comprising:
   terminating a TDM signal on each of the TDM circuits;
   generating a payload by bundling TDM data of TDM circuits having same destination address by referring to a table which stores addresses of other circuit emulation devices on the asynchronous network in a storage section, each of the TDM circuits corresponding to one of the addresses as a destination address;
   assembling a multiplex packet by adding a packet header to the payload, wherein the packet header includes the same destination address as its destination address;
   and transmitting the multiplex packet to the destination address through the asynchronous network,
   wherein the payload is generated by:
      generating an individual packet from TDM data of each TDM circuit;
      generating an individual TDM payload by deleting header information other than the circuit destination information from the individual packet; and
      generating a multiplex payload of the multiplex packet by bundling individual TDM payloads of the same destination address by referring to the table.

7. The circuit emulation method according to claim 6, wherein the generating the individual packet generates the individual packet according to Circuit Emulation Service over Packet Switched Network (CESoPSN) from TDM data of each TDM circuit.

8. The circuit emulation method according to claim 6, wherein the circuit destination information includes Emulated Circuit Identifier (ECID).

9. The circuit emulation method according to claim 6, wherein the circuit destination information includes a Multi-Protocol Label Switched (MPLS) label and UDP port number.

10. A system comprising an asynchronous network and a plurality of circuit emulation devices, wherein each circuit emulation device connects a plurality of time division multiplexing (TDM) circuits to the asynchronous network, wherein
  at a transmission-side circuit emulation device comprises:
  a table storing addresses of other circuit emulation devices on the asynchronous network, each of the TDM circuits corresponding to one of the addresses as a destination address;
  a packet assembly section for bundling TDM data of TDM circuits having same destination address by referring to the table, to assemble a multiplex packet which has a packet header including the same destination address as its destination address; and
  a transmitter for transmitting the multiplex packet to the destination address through the asynchronous network, and
  at a reception-side circuit emulation device comprises:
  a receiver for receiving the multiplex packet from the transmission-side circuit emulation device through the asynchronous network; and
  a packet disassembly section for disassembling the received multiplex packet and extracting TDM data for each TDM circuit from a payload of the received multiplex packet,
  wherein the packet assembly section comprises:
  a packet generation section for generating an individual packet from TDM data of each TDM circuit;
  an individual payload generation section for generating an individual TDM payload by deleting header information other than the circuit destination information from the individual packet; and
  a multiplex payload generating section for generating a multiplex payload of the multiplex packet by bundling individual TDM payloads of the same destination address by referring to the table.

11. The system according to claim 10, wherein the packet assembly section further comprises:
  a packet generation section for generating an individual packet according to Circuit Emulation Service over Packet Switched Network (CESoPSN) from TDM data of each TDM circuit.

12. The system according to claim 10, wherein the circuit destination information includes Emulated Circuit Identifier (ECID).

13. The system according to claim 10, wherein the circuit destination information includes a Multi-Protocol Label Switched (MPLS) label and UDP port number.

* * * * *